United States Patent [19]

Dahl et al.

[11] 4,329,406
[45] May 11, 1982

[54] SPECIFIC GRAVITY TRANSDUCER AND BATTERY PERFORMANCE INDICATOR

[76] Inventors: Ernest A. Dahl, 3247 Breaker Dr., Ventura, Calif. 93003; George H. Barry, 21225 Saratoga Hills, Saratoga, Calif. 95070

[21] Appl. No.: 248,639

[22] Filed: Mar. 27, 1981

[51] Int. Cl.³ .......................................... H01M 10/48
[52] U.S. Cl. ......................................... 429/92; 429/7; 429/53; 429/67; 320/48; 324/432; 73/32 R
[58] Field of Search .................................. 429/91–93, 429/7, 53, 72, 81, 67; 73/32 R, 440; 320/48; 324/432

[56] References Cited

U.S. PATENT DOCUMENTS 4,061,839 12/1977 Köhler .................................. 429/93
4,224,383 9/1980 Taylor .............................. 429/92 X
4,247,811 1/1981 Findl ................................ 429/93 X Primary Examiner—Charles F. Lefevour
Attorney, Agent, or Firm—Robert F. Beers; Joseph M. St.Amand

[57] ABSTRACT

A transducer and battery performance indicator which senses various levels of specific gravity and other conditions of a liquid or electrolyte of varying degrees of translucency and converts the measurements into electrical analog signals which are fed to an indicator readout. The device may include temperature and level sensors, as well as an agitator for circulating electrolyte, and a number of them are used remotely to monitor a bank of batteries.

18 Claims, 10 Drawing Figures

REMOTE INDICATOR AND ALARM

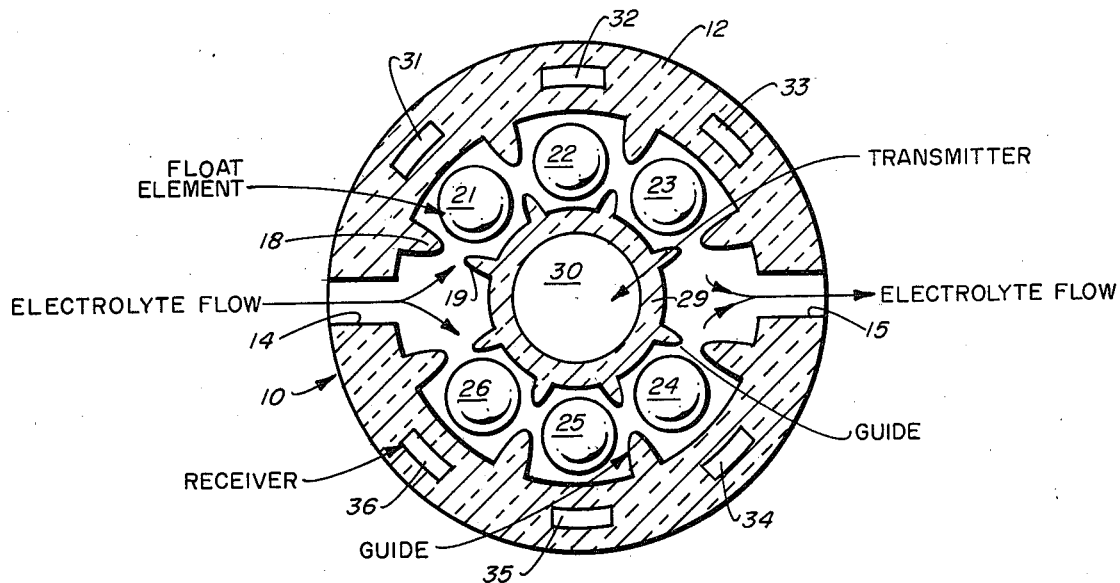
Fig. 2.
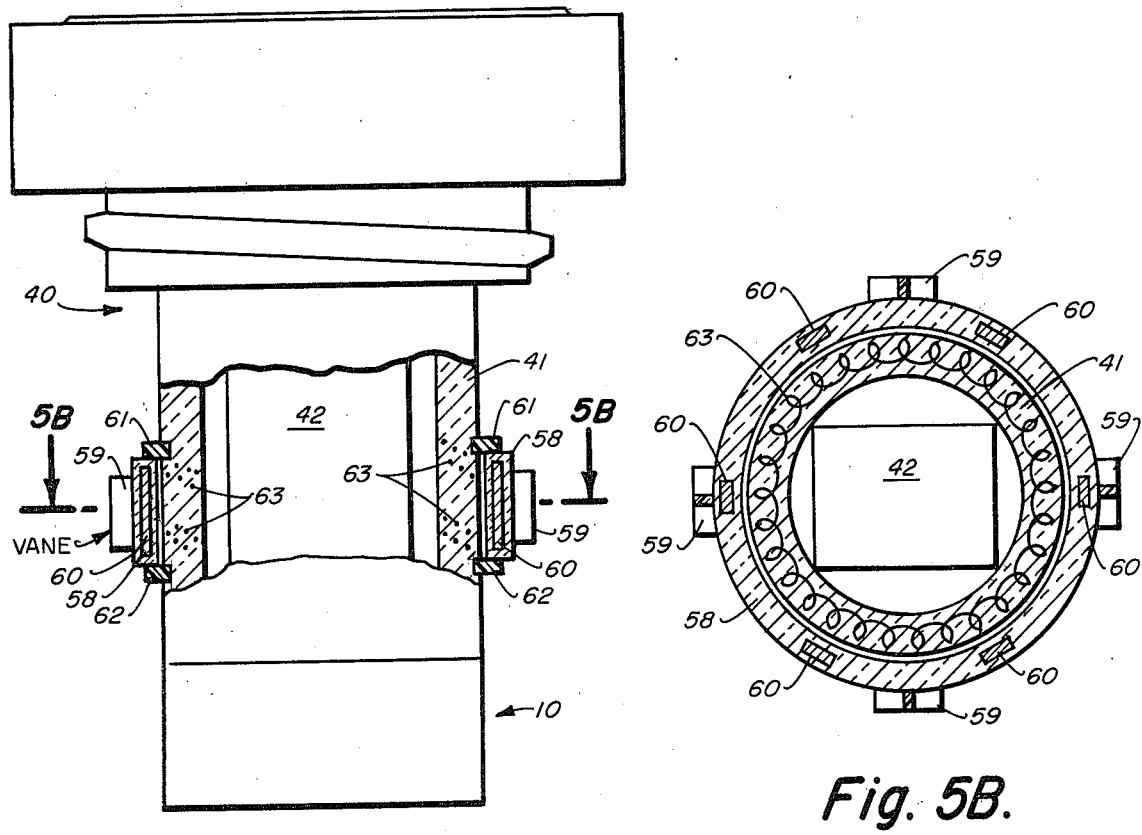
Fig. 5A.
Fig. 5B.

SPECIFIC GRAVITY TRANSDUCER AND BATTERY PERFORMANCE INDICATOR

BACKGROUND OF THE INVENTION

The present invention relates to battery performance indicators and more particularly to a transducer which senses various levels of specific gravity and other conditions of a liquid and converts the measurements into binary signals or step wise analog signals which are fed to an indicator read-out. The device of this invention is especially intended for use in measuring the specific gravity of the electrolyte in an electrical storage battery for estimating the available charge remaining in the battery along with measuring other battery conditions.

The best previously known system of measuring specific gravity in a battery is by measurement of the electrolyte using a float such as a hydrometer. The position of the hydrometer float indicates the specific gravity. Another method uses a plurality of colored balls and the specific gravity is indicated by the color of which balls float. A third system involves inserting fiber optic pipes into a chamber in a battery for transmitting a beam of light using additional fiber optic pipes for identifying the position of a float in the chamber by optical means. Another device uses a single float which carries a magnetic core to change the frequency of an oscillator and an optical interrupted light arrangement, both of which tell when specific gravity gets below a fixed point; this type of indicator requires the float to carry the magnetic core load for frequency change and the light arrangement requires a transparent electrolyte. All of these systems rely on the fact that the electrolyte is transparent and visual means or light are required to determine float level or position.

It is the object of this invention to overcome shortcomings found in the prior art and provide a simple, efficient and compact system for determining the charge condition of a battery, or for an entire bank of batteries, as well as other battery conditions.

SUMMARY OF THE INVENTION

The transducer of this invention incorporates a housing containing several small float elements having various different values of specific gravity, across a range of interest. When the specific gravity of the liquid exceeds that of the most dense element, all the elements float. When the liquid specific gravity lies between that of the most dense and the next dense element then all but the most dense element float and the most dense element sinks, etc. Thus by monitoring the states of the elements one can classify the specific gravity of the liquid into a number of ranges equal to the number of elements plus one.

The present invention uses a transmitter and receivers to sense the various states of the float elements (either floating or sunk) using conductive, radio active, acoustic, infrared, or microwave devices, etc., so that the output is in the form of electrical signal changes that are transmitted to a read-out indicator or telemetered to a remote location for monitoring the battery state. The degree of translucency of the electrolyte creates no problem.

Separate guide channels are provided for each float element, as well as individual receivers which sense the floats. The specific gravity transducer and electronic circuitry can all be included in a battery cell cap. In one embodiment the sensors and read-out indicators are all built into the battery cell cap. In another embodiment the sensor signals are transmitted to a remote read-out indicator. The remote read-out indicator can be a panel arranged to read-out the conditions of an entire bank of batteries for ease in monitoring them.

BRIEF DESCRIPTION OF THE DRAWINGS

FIG. 2 shows a planar cross-sectional view of the specific gravity transducer taken along section line 2—2 of FIG. 1;

FIG. 5A shows in a partial cutaway view another embodiment of the invention having a rotary impeller for circulating the electrolyte;

FIG. 5B is a cross-sectional view taken along section line 5B—5B of FIG. 5A;

DESCRIPTION OF THE PREFERRED EMBODIMENTS

Figure 1:
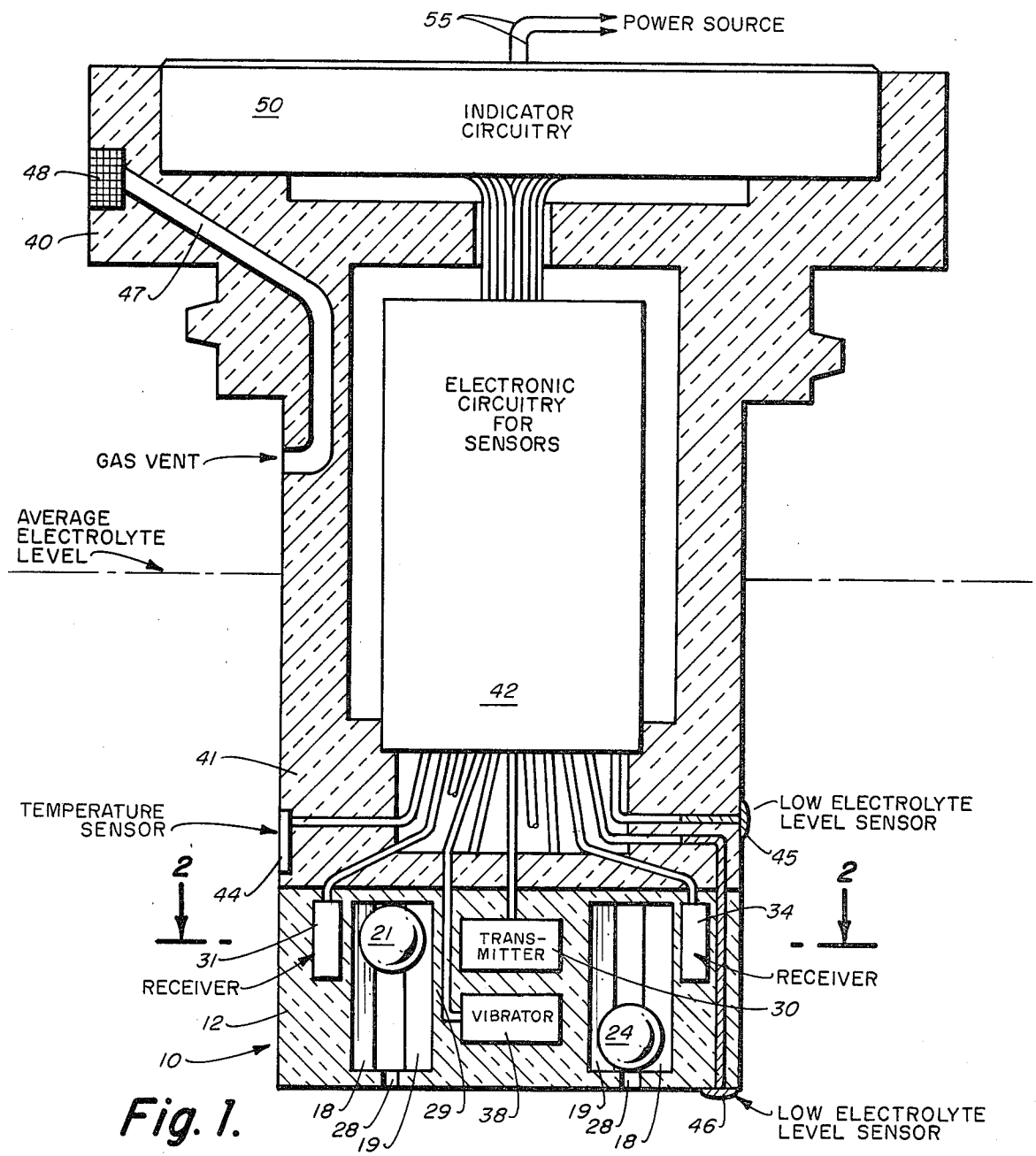
FIG. 1 is a vertical cross-sectional view of a preferred embodiment of the invention showing a specific gravity transducer, sensor electronics and indicator circuitry locations.
Figure 3:
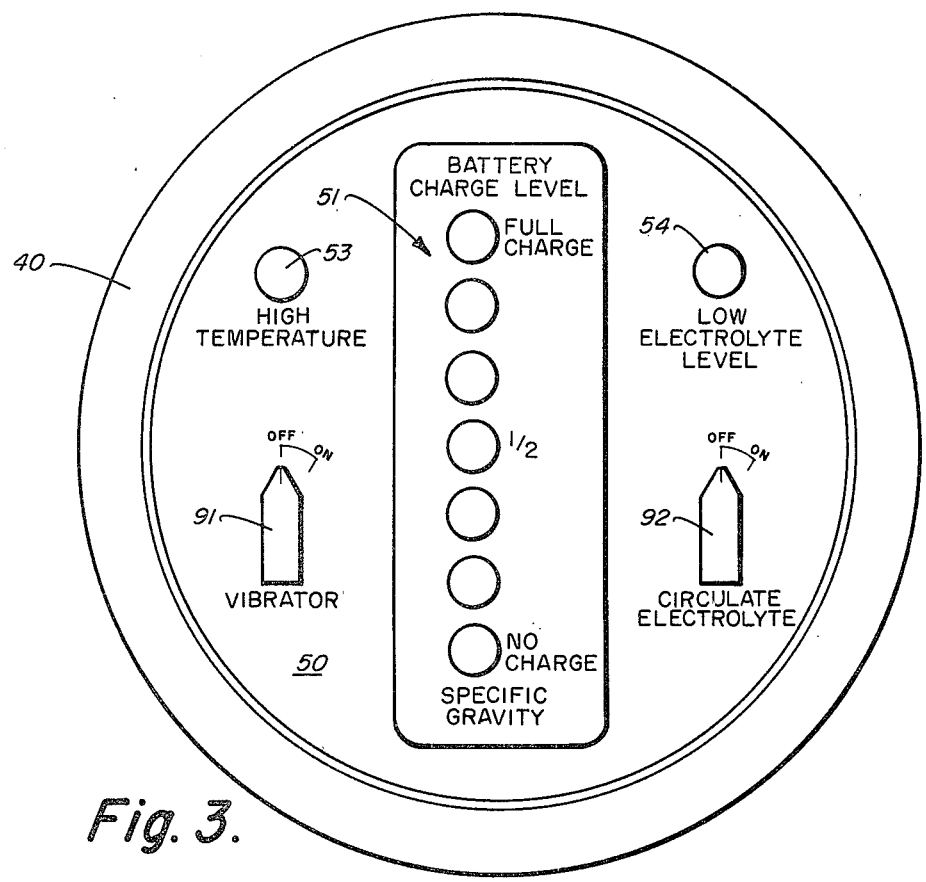
FIG. 3 is a top planar view of the embodiment shown in FIG. 1.

In the embodiment shown in FIGS. 1, 2 and 3, the specific gravity transducer assembly 10 consists of a cylindrical housing 12 of plastic, glass or other insulative material that is completely submerged in the electrolyte of a battery and has ports 14 and 15 which allow electrolyte to flow in either direction through the housing. Vertical channel guides 18 and 19 are positioned circumferentially about the interior walls of housing 12 forming a plurality of vertical channels for guiding a plurality of float elements 21, 22, 23, 24, 25 and 26. The float elements can be spherical (as shown), cylindrical or of any suitable shape and made from any suitable material such that each has a different predetermined density and floats at a predetermined specific gravity, across a range of interest.

As shown in FIG. 2, the electrolyte is allowed to flow between each pair of guides 18 and 19, assuring movement of the electrolyte through housing 12. The specific gravity of the electrolyte will determine which of the floats, if any will float or sink. If desired, additional ports 28 may be provided at the bottom of housing 12 beneath each of the floats, as shown in FIG. 1, to further assure electrolyte flow through the housing.

The center portion 29 of housing 12 includes a central emitting source 30 which transmits radially outward through the housing material. Receivers 31, 32, 33, 34, 35 and 36 are positioned in the outer wall of housing 12 adjacent the float channels formed by guides 18 and 19, as particularly shown in FIG. 2, for receiving the radiating energy from transmitter 30. Transmitter 30 and the appropriate receivers 31, 32, 33, 34, 35 and 36 can be any suitable devices, such as, microwave, radio active, acoustic, infrared, etc. Dirt and film may create restrictive limits between the transmitter and receivers where visible light beams are used. Therefore, transmitters and receivers that are operable to transmit and receive signals through electrolytes of varying degrees of translucency are preferred. When a float element floats to the top of housing 12, such as float 21 as shown in FIG. 1, it will interrupt or reduce the amount of radiation emitted by transmitter 30 that is received by its respective receiver, such as receiver 31. The receiver senses this change; and respective receivers are used to sense the status of each of the float elements.

If desired, a vibrator or pulsing device 38 can be provided in the center portion 29 of transducer 10 to prevent sticking of the floats in the channels due to "sticktion, surface tension, or film formation."

Specific gravity transducer 10 is mounted on the bottom of a battery cap 40, for example, such as shown in FIG. 1. Cap 40 is made from dielectric material, such as plastic, etc., used for making battery casings. The lower end of the stem portion 41 of cap 40 extends into the electrolyte to a point near the top of the battery plates. Respective electrical lead wires connect each of transmitter 30 and receivers 31-36 to the sensor electronic circuitry 42. Electronic circuitry 42 powers transmitter 30, and converts the outputs of receivers 31-36 into binary numbers and stepwise-analog electrical signals. A temperature sensor 44, and low electrolyte level probes 45 and 46 can also be connected to the sensor circuitry 42, if desired. Any suitable gas vent such as vent 47, can be provided in cap 40. A flame arrestor 48 can also be provided, as shown in FIG. 1.

Electronic circuitry 42, in turn, is connected to indicator circuitry 50 shown located in the top of battery cap 40 in FIG. 1. FIG. 3 illustrates an example of the indicator read-out at the top of battery cell cap 40. The battery charge level (i.e., specific gravity) is indicated by any of several of a row of LED lights 51. If the electrolyte temperature reaches a predetermined critical point, high temperature LED light 53 will light up. Also if the electrolyte level goes below a predetermined desired level, low electrolyte level LED light 54 will turn on, for example. Power for indicative circuitry 50, electronic circuitry 42 and other components, and in turn for the transmitter, vibrator, etc., is provided through monitor lines 55 connected to an external power source.

Figure 4:
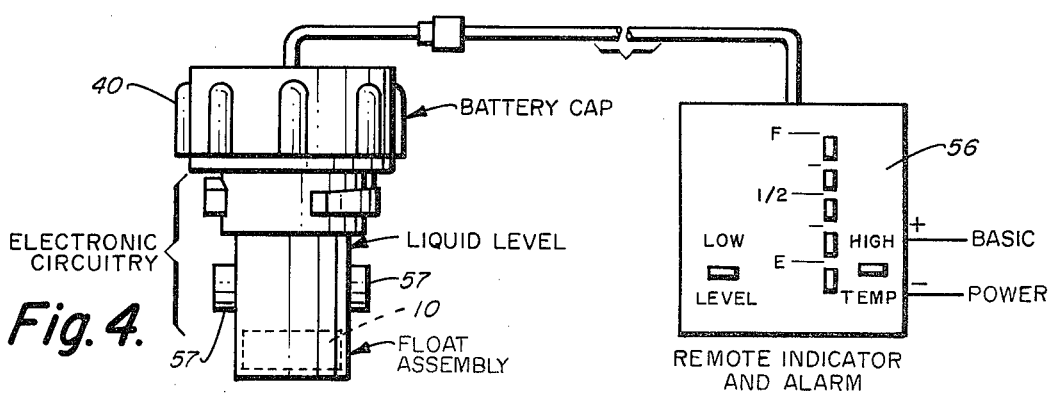
FIG. 4 is an illustration showing an embodiment of the invention having a remote read-out and ultrasonic agitator.

When desired, the output of electronic circuitry 42, can be fed via an electric cable to a remote indicator and alarm 56 at the power source, for example, as shown in FIG. 4. The remote indicator and alarm 56 can be located in a control room, for example, or on an automobile dash board. An important use of the present invention is for monitoring a bank of batteries from a control room where a read-out from each battery cell can be monitored on one read-out panel, thus allowing efficient watch over the state of each battery.

An agitator can be provided to ensure that stratification of the electrolyte does not occur, and also to reduce surface growth on cell plates. As shown in FIG. 4, a pair (or more) of ultrasonic agitator wings 57, preferably positioned at an angle to the horizontal, are used to keep the electrolyte in a stirred condition. The ultrasonic agitator 57 can incorporate crystal resonators, electromagnetic resonators, etc., and operate as needed.

In the embodiment, shown in FIGS. 5A and 5B, the agitator comprises a rotary electric motor which provides an impeller type of agitation for stirring the electrolyte. The impeller comprises a ring shaped agitator 58 having a plurality of vanes 59 thereon. A number of magnetic elements 60 are imbedded in the agitator wall. Ring shaped agitator 58 is held in place about cylindrical stem 41 of cap 40 by snap rings 61 and 62. Motor field coils 63 are embedded in the stem wall of cap 40, as shown and when an A.C. current is applied thereto the magnetic field generated in coils 63 acting against magnets 60 operates to rotate the agitator ring 58 and vanes 59 about cap stem 41 circulating the electrolyte.

Figures 6A, 6B, 6C, 7:
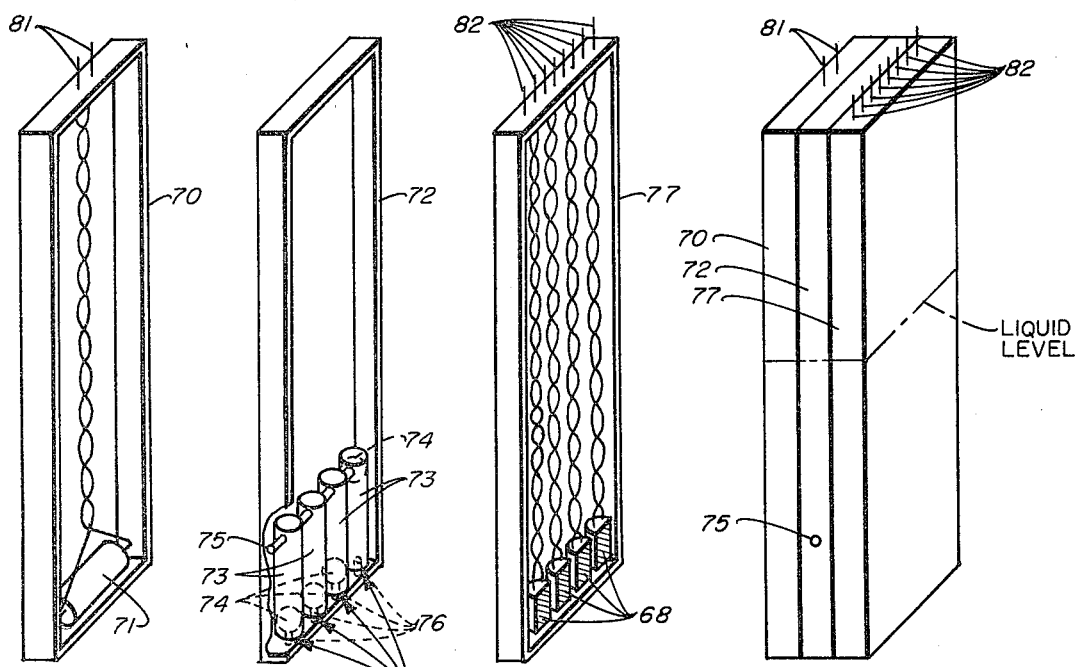
FIGS. 6A, 6B and 6C are perspective views of three modules which comprise the specific gravity transducer of another embodiment of the invention.
FIG. 7 is a perspective illustration of the assembled specific gravity transducer comprising the modules of FIGS. 6A, 6B and 6C.

In another embodiment of the invention, the specific gravity transducer consists of three or more, strip-like modules, such as shown in FIGS. 6A, 6B and 6C. The three strip-like modules are then mounted adjacently into a sandwiched assembly, as shown in FIG. 7, and one end is immersed in the electrolyte liquid. The module of FIG. 6A is the transmitting module 70 formed by insulative material such as plastic and contains a radiating source 71. Radiating source 71 is in the form of a line source or of multiple point sources arrayed across the width of module strip 70. The center module 72, shown in FIG. 6B, has a plurality of vertical chambers 73 formed therein which hold captive an equal number of float elements 74, each tuned to float at different values of specific gravity of a liquid, across a range of interest. A channel 75 through the module and ports 76 at the bottom of each chamber 73, assure electrolyte flow through each of the chambers. Module 77 shown in FIG. 6C, contains a row of receivers 78, one opposite each chamber and float element in its "sunk" position, respectively.

Radiating source 71 and receivers 78 are similar to source 30 and receivers 31-36 of FIGS. 1 and 2.

Modules 70, 72, and 77 are then assembled in a sandwich arrangement as shown in FIG. 7. Electrical lead lines 81 from radiating source 71, and lead lines 82 from receivers 78 are connected to electronic circuitry, such as 42 shown in FIG. 1, which powers radiating source 71 and which converts the receiver outputs into a binary number and/or stepwise-analog electrical signal, which in turn is connected to indicator readout circuitry, such as 50 in FIGS. 1 and 2 or 55 in FIG. 4. This embodiment also will operate in any liquid independent of varying optical translucency.

In any of the embodiments shown, electronic circuitry 42 conditions each signal from the receivers in the specific gravity transducer or the sensors depending on the type of devices used, threshold evaluates each signal to provide yes or no signals, amplifies the signal, and activates appropriate LED indicators, etc., in the readout. Switches 91 and 92, respectively, can be included on the indicator read-out, such as shown in FIG. 3, for example or at a remote location, to activate vibrator 38 in the specific gravity transducer and electrolyte circulator 57 or 58 when desired. If desired, automatic intermittent operation of the vibrator or the electrolyte circulator can be provided.

As shown in the assembly of FIGS. 6A, 6B and 6C the floats are in a sunken position and a transmitter-to-receiver path of radiated energy is fully completed when any of the balls float, rather than when they sink as in FIG. 1. This arrangement provides a failsafe feature in that failure of either the transmitter 71 or a receiver 68 will result in a low specific gravity indication that can be reflected at the indicator or alarm. Either type arrangement can be used interchangeably with the system of FIG. 1 or 4.

While particularly suited for monitoring batteries, this invention can be used to monitor the specific gravity, temperature, level, etc., of other fluids, on site or remotely.

Obviously, many modifications and variations of the present invention are possible in the light of the above teachings. It is therefore to be understood that within the scope of the appended claims the invention may be practiced otherwise than as specifically described.

What is claimed is:

1. A battery performance indicator for measuring and monitoring battery conditions, comprising:
    a. a specific gravity transducer operable to detect various values of specific gravity of a battery liquid electrolyte across a range of interest when said specific gravity transducer is submersed in the liquid electrolyte;
    b. electronic circuit means connected to said specific gravity transducer for converting detection signals from said specific gravity transducer into electrical analog signals representative of the specific gravity of said liquid electrolyte;
    c. read-out means electrically connected to said electronic circuit means for indicating the value of the specific gravity of said liquid electrolyte in response to analog signals from said electronic circuit means;
    d. said specific gravity transducer, comprising:
        a housing of dielectric material having a plurality of adjacent vertical channels disposed throughout said housing;
        passage means for allowing liquid electrolyte flow from outside said housing throughout said housing and said vertical channels and return outside said housing;
        each of said vertical channels containing a respective float means; each said respective float means being adapted to float in said liquid electrolyte at a different predetermined specific gravity across a range of interest;
        an emitting source located in said housing on one side of said vertical channels; said emitting source being positioned and operable to radiate energy across one end of each of said vertical channels;
        a plurality of receiver elements equal in number to the number of vertical channels; one receiver element being positioned on the opposite side of each said vertical channel directly across from said emitting source; each said receiver element being operable to receive radiated energy signals transmitted from said emitting source through said electrolyte and across the respective ends of said vertical channels;
        each respective float means when coming between said emitting source and its respective receiver element being operable to attenuate the radiated energy signal from said emitting source that is received by the respective receiver element;
        said attenuation by said respective float means of the radiation signals received by respective receiver elements operating to produce detection signals indicative of the specific gravity of the liquid electrolyte within the range of interest; said detection signals being fed to said electronic circuit means and in turn to said read-out means;
    e. a power source for providing electrical power to said transducer, said electronic circuitry and said read-out means.

2. A device as in claim 1 wherein said specific gravity transducer housing is cylindrical; said vertical channels are positioned circumferentially about the interior of said housing; said emitting source is located centrally within said housing and said receiver elements are located in the outer wall of said housing.

3. A device as in claim 1 wherein said specific gravity transducer housing comprises a plurality of flat modules sandwiched together; a first module containing said emitting source; a second module containing said vertical channels and their respective float means as well as said passage means for electrolyte flow; and a third module containing said receiver elements.

4. A device as in claim 1 wherein said specific gravity transducer is located at the bottom of a battery cell cap, said electronic circuitry is located within the stem of said battery cell cap, and said read-out means is located at the top of said battery cell cap.

5. A device as in claim 4 wherein a gas vent and flame arrestor are provided in said battery cell cap.

6. A device as in claim 1 or 4 wherein said read-out means is located in a remote area for monitoring battery conditions in another location.

7. A device as in claim 1 or 4 wherein a temperature sensing means is provided in said stem for monitoring critical temperature conditions of the liquid electrolyte.

8. A device as in claim 1 or 4 wherein electrolyte level sensor means are included to detect low liquid electrolyte level.

9. A device as in claim 1 or 4 wherein agitator means is provided for circulating the liquid electrolyte.

10. A device as in claims 1, 2, 3 or 4 wherein a vibrator means is provided in said specific gravity transducer housing, said vibrator means being operable to prevent sticking of said floats due to film formation or surface tension.

11. A device as in claims 1 or 4 wherein ultrasonic agitator wings are provided to prevent stratification of the liquid electrolyte and reduce surface growth.

12. A device as in claims 1 or 4 wherein a rotary electric motor driven impeller is provided to circulate the liquid electrolyte and prevent surface growth.

13. A device as in claim 4 wherein a rotary electric motor driven impeller type agitator is provided for circulation of the liquid electrolyte;
    said agitator, comprising:
        a ring shaped impeller rotatably mounted for rotation about the stem of said battery cell cap;
        said ring shaped impeller having circulation vanes on the outer wall and having a plurality of magnetic elements embedded in the wall thereof;
        motor field coils being embedded in the wall of said stem located opposite said magnetic elements and connected to said electronic circuitry;
    whereby a magnetic field generated in said field coils acts against said magnetic elements in the ring shaped impeller causing the impeller to rotate and circulate the electrolyte.

14. A specific gravity transducer, comprising:
    a. a housing of dielectric material operable to be immersed in a liquid and having a plurality of adjacent vertical channels disposed throughout said housing;
    b. passage means for allowing flow of said liquid from outside said housing throughout said housing and said vertical channels and return outside said housing;

c. each of said vertical channels containing a respective float means; each said respective float means being adapted to float in said liquid at a different predetermined specific gravity across a range of interest;

d. an emitting source located in said housing on one side of said vertical channels; said emitting source being positioned and operable to radiate energy across one end of each of said vertical channels;

e. a plurality of receiver elements equal in number to the number of vertical channels; one receiver element being positioned on the opposite side of each said vertical channel directly across from said emitting source; each said receiver element being operable to receive radiated energy signals transmitted from said emitting source through said liquid and across the respective ends of said vertical channels;

f. each respective float means when coming between said emitting source and its respective receiver element being operable to attenuate the radiated energy signal from said emitting source that is received by the respective receive element;

g. said attenuation by said respective float means of the radiation signals received by respective receiver elements operating to produce detection signals indicative of the specific gravity of the liquid within the range of interest; said detection signals being fed to a read-out means;

h. a power source for providing electrical power to said emitting source and receiver elements and to said read-out means.

15. A device as in claim 14 wherein said specific gravity transducer housing is cylindrical; said vertical channels are positioned circumferentially about the interior of said housing; said emitting source is located centrally within said housing and said receiver elements are located in the outer wall of said housing.

16. A device as in claim 14 wherein said specific gravity transducer housing comprises a plurality of flat modules sandwiched together; a first module containing said emitting source; a second module containing said vertical channels and their respective float means as well as said passage means for electrolyte flow; and a third module containing said receiver elements.

17. A device as in claim 14 wherein a vibrator means is provided in said specific gravity transducer housing, said vibrator means being operable to prevent sticking of said floats due to film formation or surface tension.

18. A device as in claims 1, 2, 14 and 15 wherein said vertical channels are formed from vertical guide means along interior walls of said housing.

* * * * *